US008782258B2

(12) United States Patent
Brittain et al.

(10) Patent No.: US 8,782,258 B2
(45) Date of Patent: Jul. 15, 2014

(54) TRANSFERRING WEB DATA BETWEEN OPERATING SYSTEM ENVIRONMENTS

(75) Inventors: David Brittain, Belmont, CA (US); Su-Yin Gan, Santa Clara, CA (US); Ansuman Tapan Satpathy, Sunnyvale, CA (US); Judy C. Tsai, Los Altos, CA (US)

(73) Assignee: Motorola Mobility LLC, Chicago, IL (US)

( * ) Notice: Subject to any disclaimer, the term of this patent is extended or adjusted under 35 U.S.C. 154(b) by 515 days.

(21) Appl. No.: 12/984,387

(22) Filed: Jan. 4, 2011

(65) Prior Publication Data
US 2012/0173741 A1   Jul. 5, 2012

(51) Int. Cl.
G06F 15/16   (2006.01)
G06F 9/54    (2006.01)
G06F 17/30   (2006.01)

(52) U.S. Cl.
CPC ............ *G06F 9/54* (2013.01); *G06F 17/30893* (2013.01)
USPC ......................................................... 709/228

(58) Field of Classification Search
CPC .............................. G06F 17/30893; G06F 9/54
USPC .................................. 709/220, 221, 227, 228
See application file for complete search history.

(56) References Cited

U.S. PATENT DOCUMENTS

| 7,158,154 | B2 | 1/2007 | Kim et al. | |
|---|---|---|---|---|
| 7,376,949 | B2 | 5/2008 | Lowell et al. | |
| 2003/0105873 | A1* | 6/2003 | Ye et al. | 709/230 |
| 2003/0182405 | A1* | 9/2003 | Gava et al. | 709/221 |
| 2004/0039862 | A1 | 2/2004 | Hunt et al. | |
| 2004/0143738 | A1* | 7/2004 | Savage et al. | 713/168 |
| 2005/0021788 | A1* | 1/2005 | Tucker et al. | 709/229 |
| 2005/0033843 | A1* | 2/2005 | Shahi et al. | 709/226 |
| 2006/0010246 | A1* | 1/2006 | Schulz et al. | 709/232 |
| 2008/0034193 | A1* | 2/2008 | Day et al. | 712/244 |
| 2010/0042742 | A1* | 2/2010 | Christianson et al. | 709/238 |
| 2010/0064228 | A1* | 3/2010 | Tsern | 715/740 |
| 2010/0122197 | A1* | 5/2010 | Fujioka | 715/769 |
| 2010/0251265 | A1* | 9/2010 | Hodson et al. | 719/319 |
| 2010/0306224 | A1* | 12/2010 | Ciemiewicz et al. | 707/759 |
| 2011/0022500 | A1* | 1/2011 | Scheinfeld et al. | 705/27.2 |
| 2011/0283291 | A1 | 11/2011 | Tobe et al. | |
| 2012/0089906 | A1* | 4/2012 | Reeves et al. | 715/255 |
| 2012/0143944 | A1* | 6/2012 | Reeves et al. | 709/203 |

FOREIGN PATENT DOCUMENTS

WO   2007035611 A2   3/2007

OTHER PUBLICATIONS

Patent Cooperation Treaty, "PCT Search Report and Written Opinion of the International Searching Authority" for International Application No. PCT/US2011/067737 dated Aug. 1, 2012, 16 pages.

(Continued)

*Primary Examiner* — Kostas Katsikis

(57) ABSTRACT

An electronic device having a multi-environment operating system (OS) is disclosed. The electronic device creates a web session and/or updates a browser configuration in a first OS environment based on a web session and/or a browser configuration in a second OS environment. The web session is created and/or the browser configuration is updated when a primary OS environment transitions from the second OS environment to the first OS environment. The transition may occur when the device transitions from a docked mode to a mobile mode, or from a mobile mode to a docked mode.

25 Claims, 5 Drawing Sheets

(56) References Cited

OTHER PUBLICATIONS mozillaZine: "Moving your profile folder", http://web.archive.org/web/28188287172841/http://kb.mozillazine.org/Moving_your_profile-folder, Jan. 29, 2818 (2818-81-29), XP882679329; retrieved on Jul. 5, 2012, the whole document; 4 pages.
U.S. Appl. No. 61/226,988, filed Jul. 20, 2009, Galicia et al.
U.S. Appl. No. 12/838,868, filed Jul. 19, 2010, Galicia et al.
U.S. Appl. No. 61/226,974, filed Jul. 20, 2009, Galicia et al.
U.S. Appl. No. 12/838,668, filed Jul. 19, 2010, Galicia et al.
U.S. Appl. No. 61/226,955, filed Jul. 20, 2009, Galicia et al.
U.S. Appl. No. 12/839,069, filed Jul. 19, 2010, Galicia et al.
U.S. Appl. No. 61/291,269, filed Dec. 30, 2009, Galicia et al.
U.S. Appl. No. 12/838,984, filed Jul. 19, 2010, Galicia et al.
U.S. Appl. No. 12/839,193, filed Jul. 19, 2010, Galicia et al.

* cited by examiner

TRANSFERRING WEB DATA BETWEEN OPERATING SYSTEM ENVIRONMENTS

FIELD OF THE INVENTION

The present invention relates generally to operating systems, and more particularly, to operating systems including multiple environments.

BACKGROUND

General-purpose operating systems such as Linux™ and Windows™ have an extensive set of features, such as file systems, device drivers, applications, libraries, etc. Although general-purpose operating systems may be suitable operating systems for generally stationary computing devices, such as a desktop computer, the general-purpose operating systems may not be suitable operating systems for mobile devices, such as mobile phones, smart phones, and tablet computers. Operating systems that have the features of an embedded or real time operating system, including real time performance, may be more suitable for mobile devices. As the computing power of the mobile devices increases, the mobile devices may be used as standalone devices in mobile environments as well as used with peripheral devices, such as computers, monitors, and projectors, in relatively stationary environments. When mobile devices transition from the mobile environments to the stationary environments or vice versa, the operating systems of the mobile devices may transition from a mobile operating system environment to a general-purpose operating system environment, or vice versa.

In both the mobile environment and the stationary environment, the mobile device may have network connectivity, such as the ability to connect to the Internet or to a private intranet, using a wired or wireless connection. While connected to the internet, a user of the mobile device may create a web session that consists of open websites, webpages, web applications, or other information that was accessed over a network using a uniform resource locator (URL). The user of the mobile device may wish to have the web session stay open, or easily recreate the web session, when changing environments. As an example, a user may be viewing a webpage on the mobile device at home over a wireless home network. While connected to the wireless home network, the mobile device is operating in the general purpose environment. If the user has to leave the home, such as to go to work or run an errand, the user may want to keep the webpage open, or easily reopen the webpage.

When leaving the home, the mobile device may transition from the general-purpose operating environment to the mobile operating environment. In order to reopen the webpage, the user must copy the URL associated with the webpage in the address bar while still in the general-purpose environment. After the mobile device transitions from the general-purpose environment to the mobile environment, the user opens a browser in the mobile environment and pastes the URL in an address bar in the browser in the mobile environment. Copying and pasting functions may be difficult and time consuming using mobile devices. The copying and pasting functions become even more problematic if multiple websites or webpages are open in multiple tabs or multiple browser windows. Further, if the user is running a web-based application, such as an email account, the user does not have an easy way to re-access the email that he or she was viewing. Instead, the user has to login again and reopen the email that he or she was viewing.

Additionally, while the user is navigating through websites and/or entering information in the webpages using a web browser, the configuration of the web browser may change. For example, the user's browser history may change or the user may have entered a new password. When transitioning from one environment to another environment, the web browser that is opened in the other environment does not know any of the configuration changes that were made in the first environment. The user may have to enter the configuration information into the browser in the other environment.

DETAILED DESCRIPTION

The present disclosure describes creating a web session in a first operating system (OS) environment based on a web session in a second OS environment when a primary OS environment transitions or changes from the second OS environment to the first OS environment. The present disclosure also describes updating a web browser configuration in a first OS environment based on a web browser configuration in a second OS environment when the primary OS environment transitions or changes from the second OS environment to the first OS environment. The first OS environment and the second OS environment may be simultaneously run on a single kernel in an OS of an electronic device. The electronic device may include a processor coupled to a memory having executable instructions configured to initiate the OS.

Figure 1:
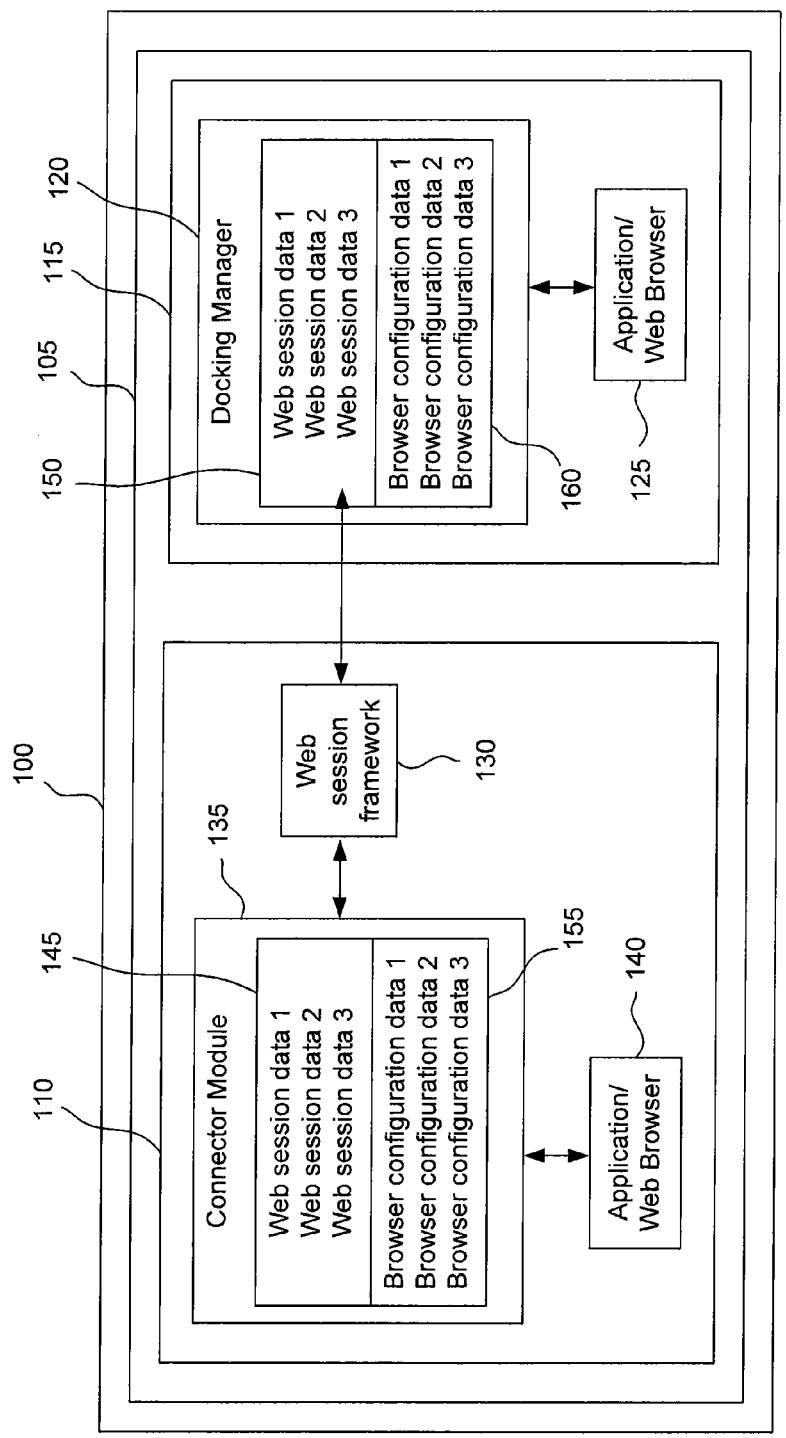
FIG. 1 is a block diagram representing in schematic form exemplary components of two operating system environments that are used to transfer web session data and/or web browser configuration data from one operating system environment to another, and to create a web session and/or update a configuration of a web browser in the other operating system environment.

FIG. 1 illustrates an operating system 105 of an electronic device 100 having a first OS environment 110 and a second OS environment 115 and includes the components of the first and second OS components 110, 115 that are used to create a web session and/or update a web browser configuration in the first OS environment 110 when the primary OS environment of the operating system transitions or changes from the second OS environment 115 to the first OS environment 110. In an exemplary embodiment of the operating system 105, one of the OS environments 110, 115 is an embedded OS environment intended for mobile computing in a mobile device (e.g., a mobile phone, a smartphone, a tablet computer), and the other of the OS environments is a general purpose computer OS environment that is not intended for use with mobile devices and/or for use with electronic devices that are generally stationary, such as a desktop computer or a laptop computer. The general-purpose OS environment may be a webtop environment. Other OS environments may be used. Alternatively, both OS environments 110, 115 may be mobile OS environments, or both OS environments may be general-purpose OS environments. Also, alternatively or in addition, more than two OS environments may be included in an operating system 105. Electronic devices having multi-environment operating systems are described in U.S. patent application Ser. Nos. 12/838,668; 12/838,868; 12/838,984; 12/839,069; and 12/839,193, and are incorporated by reference herein.

As shown in FIG. 1, the second OS environment 115 includes a docking manager module 120 that may be configured to determine a transition or change of a primary OS environment from the second OS environment 115 to the first OS environment 110. The docking manager module 120 may also configured to determine web session data associated with a web session in the second OS environment 115. The web session may include web sites, web application, web content, or any other electronic information, such as text, images, sounds, videos, and/or animations, that can be accessed over the Internet, an intranet, or other computer network. The web session may be an open web session, such as a web session that includes websites open in an active web browser and/or displayed to a user in the second OS environment 115. The web session may also include web sites and/or web applications that are identified in a web browser's history. The web session data may be data associated with the web session that activates one or more applications in one of the OS environments 110, 115. The application may be used to access and/or open the web session. The web session data may include a uniform resource locator (URL), favicon, and/or title of the website, webpage, or web application.

The docking manager module 120 may also be configured to receive a mode state change signal. The mode state change signal may indicate that the primary OS environment has transitioned or changed from the second OS environment 115 to the first OS environment 110. Alternatively or in addition, the mode state change signal may indicate that the electronic device 100 has changed from a docked mode to an undocked mode, or from the undocked mode to the docked mode. The mode state change signal and generation thereof is described in more detail below. The undocked mode may be referred to as a mobile mode. The docked mode may be a mode that the electronic device 100 is in when the electronic device 100 is connected to a peripheral device (not shown), such as a monitor, and the general-purpose OS environment is the primary OS environment. Also, the mobile mode may be a mode that the electronic device 100 is in when the electronic device 100 is not connected to a peripheral device and the mobile OS environment is the primary OS environment. As shown in FIG. 1, the docking manager module 120 may be in communication with an application 125, such as a web browser. The docking manager module 120 may be configured to query the web browser 125 in the second OS environment 115 for the web session data. The docking manager module 120 may be configured to query the web browser 125 after determining a transition of the primary OS environment from the second OS environment 115 to the first OS environment 110. In one example, the docking manager module 120 is configured to query the web browser 125 in response to receiving a mode state change signal. The web browser may be configured to provide the docking manager module 120 with the web session data in response to being queried by the docking manager module 120. The web browser 125 may include one or more individual components or modules that receives the query from the docking manager module 120 and/or provides the web session data to the docking manager module 120. The docking manager module 120 may also be configured to send or transfer the web session data to the first OS environment 110.

In an exemplary embodiment, the first OS environment 110 may include a web session framework 130 that provides one or more application programming interfaces (API) used to send and/or receive the web session data. The docking manager module 120 may use the framework 130 to send the web session data to the first OS environment 110. The first OS environment 110 may also include a connector module 135 that is configured to receive the web session data from the second OS environment 115. The connector module 135 may also be configured to parse and/or store the web session data. The connector module 135 may parse the web session data based on individual web sites and/or web applications that make up a web session. For example, the web session data may be divided or organized based on URLs, favicons, and/or titles associated with individual websites or web applications of the web session, and the connector module parses the web session data according to the URLs, favicons, and/or titles. The URL, favicon, and/or title information may be separated, organized, or grouped into fields, and the connector module 135 may parse the web session data according to the fields. The connector module 135 may store the parsed web session data in one or more storage locations in hardware (not shown in FIG. 1) of the electronic device 100.

The connector module 135 may be used to create a web session in the first OS environment 110. The web session in the first OS environment 110 may consist of one or more websites, web applications, and/or other web information from the web session from the second OS environment 115. The web session in the first OS environment 110 may be created by activating an application 140, such as a web browser, in the first OS environment 110. In one example, the connector module 135 may be configured to automatically activate one or more applications 140 that access and/or open the websites, web applications, and/or other web information associated with the web session data that was parsed and/or stored. Alternatively or in addition, the connector module 135 may be configured to display the web session data or information indicating the web session data in a user interface 145. The user interface 145 may be a component of the web connector 135. Alternatively, the user interface 145 may be an application of the first OS environment 110 that is separate from the web connector 135. The user interface may be invoked by an application launcher short cut in a launcher menu of the first mobile OS environment. In addition, a notification in a status/notification bar of the first OS environment may be displayed in which a user can easily access the user interface 145 by selecting the notification.

The web session data may be displayed in the user interface 145 for a user selection. After the user selects one or more web session data in the user interface 145, the web session is created in the first OS environment 110 based on the user selection. As an example, the user interface may display a URL. After the user selects the URL, an application 140, such as a web browser, in the first OS environment 110 is activated, and the web browser 140 accesses and/or opens a website, web application, web page, and/or other web information associated with the selected URL.

Alternatively or in addition, the docking manager 120 and the connector module 135 may switch functions. For example, the connector module 135 may be configured to determine a transition from one of the OS environments 110, 115 and query the web browser 140 for web session data. The connector module 135 may also be configured to send or transfer the web session data to the second OS environment 115. The connector module 135 may use the web session framework 130 to send or transfer the web session data to the second OS environment 115. The docking manager module 120 may be configured to receive the web session data from the connector module 135. The docking manager 120 may be configured to create a web session in the second OS environment 115 based on all or part of the web session data received from the first OS environment 110. The docking manager 120 may be configured to parse and/or store the web session data. In addition, the docking manager 120 may be configured to activate the web browser 125 that opens one or more websites, webpages, web applications, or other web data associated with the web session data. The docking manager 120 may also be configured to display the web session data using a user interface 150. The web session data may be displayed in the user interface 150 for a user selection. After the user selects one or more web session data in the user interface 150, the web session is created in the second OS environment 115 based on the user selection. As an example, the user interface may display a URL. After the user selects the URL, the web application 125, such as a web browser, in the second OS environment 115 is activated, and the web browser 125 accesses and/or opens a website, web application, web page, and/or other web information associated with the selected URL.

Alternatively or in addition, the docking manager module 120 and the connector module 135 may be configured to perform dual roles. For example, when the primary OS environment switches from the second OS environment 115 to the first OS environment 110, the docking manager module 120 queries the web browser 125 for web session data and sends the web session data to the first OS environment 110. The connector module 135 receives the web session data and creates the web session in the first OS environment. On the other hand, when the primary OS environment switches from the first OS environment 110 to the second OS environment 115, the connector module 135 queries the web browser 140 for web session data and the connector module 135 sends the web session data to the docking manager module 120. The docking manager module 120 receives the web session data and creates the web session in the second OS environment 115.

As explained above, one of the OS environments 110, 115 may be a mobile OS environment and the other of the OS environments 110, 115 may be a general-purpose OS environment. When the primary OS environment transitions from the general-purpose OS environment to the mobile OS environment, the electronic device 100 is transitioning from a docked mode to a mobile mode. Likewise, when the primary OS transitions from the mobile OS environment to the general-purpose environment, the electronic device 100 is transitioning from a mobile mode to a docked mode. If the first OS environment 110 is the mobile OS environment, and the second OS environment 115 is the general-purpose environment, then when the electronic device 100 transitions from the docked mode to the mobile mode, the docking manager 120 is configured to send the web session data to the first OS environment 110. Likewise, when the electronic device transitions from the mobile mode to the docked mode, the connector module 135 is configured to send web session data to the second OS environment. On the other hand, if the first OS environment 110 is the general-purpose environment and the second OS environment 115 is the mobile environment, then when the electronic device 100 transitions from the docked mode to the undocked mode, the connector module 135 is configured to send the web session data to the second OS environment 115. Likewise, when the electronic device 100 transitions from a mobile mode to a docked mode, then the docking manager 120 is configured to send the web session data to the first OS environment 110.

Alternatively or in addition, a configuration of the web browser in the first OS environment 110 may be updated, modified, reset, and/or changed based on a configuration of the web browser 125 in the second OS environment 115 when the primary OS environment transitions or changes from the second OS environment 115 to the first OS environment 110. In response to determining that the primary OS has transitioned from the second OS environment 115 to the first OS environment 110, the docking manager module 120 may be configured to query the web browser 125 in the second OS environment 115 for configuration data of the web browser 125. The configuration data of the web browser 125 may include one more of the following: browsing history, download history, search history, form field entry history, cookies, login and/or password data, home page information, bookmark information, pop-up information, and/or webpage display information. Other web browser configuration data or settings may be included. The web browser 125 may be configured to send the web browser configuration data to the docking manager module 120. One or more individual components or modules of the web browser 125 may be configured to receive and/or send the configuration data to the docking manager module 120.

The docking manager module 120 may be configured to send the web browser configuration data to the first OS environment 110. The docking manager module 120 may be configured to send or transfer the web browser configuration data with the web session data. Alternatively, the docking manager module 120 may send or transfer the web browser configuration data separate from the web session data. The docking manager module 120 may use the websession framework 130 in the first OS environment 110 in order to send the browser configuration data to the first OS environment 110. The docking manager module 120 may send the web browser configuration data over an unsecured or a secured channel. One or more techniques may be used to create a secured channel, such as using encryption, hash functions, certificates, tokens, and/or any other techniques known for creating a secured channel.

The first OS environment 110 may receive the web browser configuration data using the connector module 135. The connector module 135 may be configured to receive, parse, and/or store the web browser configuration data. The connector module may also be configured to update, modify, reset, and/or change the configuration of the web browser 140 in the first OS environment 110 using the web browser configuration data received from the second OS environment 115. The connector module 135 may also be configured to display the web browser configuration data in a user interface 155. The connector module 135 may be configured to display all of the configuration data in the user interface 155. Alternatively, the connector module 135 may be configured to display in the user interface 155 only the configuration data that is applicable to the web browser 140 in the first OS environment 110. For example, if one of the configuration data from the browser 125 in the second OS environment 115 is not used in the configuration for the web browser 140 in the first OS environment 110, the connector module 135 may not display that configuration data in the user interface 155. The user interface used to show the configuration data may be a different user interface than the interface that is used to show the web session data. Alternatively, the user interface 145 used to display the web session data and the user interface 155 used to display the browser configuration data may be the same. A user may select one or more configuration data to update, modify, reset, and/or change the configuration of the browser 140. The user may select all of the configuration data displayed in the user interface 155. Alternatively, the user may customize the configuration update of the web browser 140 in the first OS environment 110 by selecting less than all of the configuration data that is displayed.

Alternatively or in addition, the docking manager 120 and the connector module 135 may switch functions. For example, the connector module 135 may be configured to determine a transition from one of the OS environments 110, 115 and query the web browser 140 for web browser configuration data. The connector module 135 may also be configured to send or transfer the web browser configuration data to the second OS environment 115. The connector module 135 may use the framework 130 to send or transfer the web browser configuration data to the second OS environment 115. The docking manager module 120 may be configured to receive the web browser configuration data from the connector module 135. The docking manager 120 may be configured to update, modify, reset, and/or change the configuration of the web browser 125 in the second OS environment 115 based on all or part of the web session data received from the first OS environment 110. The docking manager 120 may be configured to parse and/or store the web browser configuration data. The docking manager module 120 may also be configured to display the web browser configuration data in a user interface 160. The docking manager module 120 may be configured to display all of the configuration data in the user interface 160. Alternatively, the docking manager module 120 may be configured to display in the user interface 160 only the configuration data that is applicable to the web browser 125 in the second OS environment 115. For example, if one of the configuration data from the browser 140 in the first OS environment 110 is not used in the configuration for the web browser 125 in the second OS environment 115, the docking manager module 120 may not display that configuration data in the user interface 160. The user interface used to show the configuration data may be a different user interface than the interface that is used to show the web session data. Alternatively, the user interface 150 used to display the web session data and the user interface 160 used to display the browser configuration data may be the same. A user may select one or more configuration data to update, modify, reset, and/or change the configuration of the browser 125. The user may select all of the configuration data displayed in the user interface 160. Alternatively, the user may customize the configuration update of the web browser 125 in the second OS environment 115 by selecting less than all of the configuration data that is displayed.

Alternatively or in addition, the docking manager module 120 and the connector module 135 may be configured to perform dual roles when updating, modifying, resetting, and/or changing the web browsers 125, 140 in the first and second OS environments 110, 115, respectively. For example, when the primary OS environment switches from the second OS environment 115 to the first OS environment 110, the docking manager module 120 queries the web browser 125 for web browser configuration data and sends the web browser configuration data to the first OS environment 110. The connector module 135 receives the web browser configuration data and updates, modifies, changes, and/or resets the web browser configuration in the first OS environment 110. On the other hand, when the primary OS environment switches from the first OS environment 110 to the second OS environment 115, the connector module 135 queries the web browser 140 for web browser configuration data and the connector module 135 sends the web browser configuration data to the docking manager module 120. The docking manager module 120 receives the web browser configuration data and updates, modifies, changes, and/or resets the configuration of the web browser in the second OS environment 115. As explained above, one of the OS environments 110, 115 may be a mobile OS environment and the other of the OS environments 110, 115 may be a general-purpose OS environment. When the primary OS environment transitions from the general-purpose OS environment to the mobile OS environment, the electronic device 100 is transitioning from a docked mode to a mobile mode. Likewise, then the primary OS transitions from the mobile OS environment to the general-purpose environment, the electronic device 100 is transitioning from a mobile mode to a docked mode. If, for example, the first OS environment is the mobile OS environment and the second OS environment 115 is the general-purpose OS environment, then when the electronic device 100 transitions from a mobile mode to a docked mode, the docking manager module 120 is configured to query the web browser 125 for the web session data and send or transfer the web browser configuration data to the first mobile OS environment 110. Similarly, when the electronic device 100 transitions from the docked mode to the mobile mode, the connector module is configured to query the web browser 140 for the web browser configuration data and send or transfer the web browser configuration data to the second OS environment 115.

The web session data and/or the web browser configuration data may be transferred to and from docking manager module 120, the connector module 135, and/or web applications/browsers 125, 140 using intents. An intent may be a data structure that contains a description of an action to be performed on data. An intent may include the data on which an action is to be performed. The intent may also include, indicate, and/or specify the action. In one example, after the docking manager 120 determines a transition of the primary OS environment from the second OS environment 115 to the first OS environment 110, the docking manager module generates an intent and sends the intent to the first OS environment. The intent may include the web session data and/or the web configuration data. The intent may also include one or more actions to perform on the data, such as parsing the data, storing the data, opening the web application/browser 140, opening a user interface 145, 155 that displays the web session data and/or the web browser configuration data, and/or configuring the web browser 140. Similarly, as an example, after the connector module 120 determines a transition of the primary OS environment from the first OS environment 110 to the second OS environment 115, the connector module 135 may generate an intent and send the intent to the second OS environment. The intent may include the web session data and/or the web configuration data. The intent may also include one or more actions to perform on the data, such as parsing the data, storing the data, opening the web application/browser 125, opening a user interface 150, 160 that displays the web session data and/or the web browser configuration data, and/or configuring the web browser 125.

Alternatively or in addition, an intent may be generated by the docking manager module 120 and/or the connector module 130 after a user makes a user selection of the web session data and/or the web browser configuration data. As an example, after the connector module 135 displays the web session data on the user interface 145 and the user selects the web session data, the web connector 135 generates an intent and sends the intent to the web browser 140 in the mobile OS environment framework (e.g., an Android™ framework). The intent contains the selected web session data, such as a selected URL. The intent may also contain one or more actions, such as to open one or more websites or webpages associated with the web session data in the web browser 140. After receiving the intent, the web browser is activated and the websites, webpages, web applications, and/or other web information associated with the web session data are opened in the web browser 140. If, for example, the web session data is associated with a web-based application 140, then the mobile OS environment framework would instruct the application 140 associated with the web session data to open and handle the web session data. For example, if a URL is associated with a YouTube video, the mobile OS environment framework launches a YouTube application and the YouTube video associated with the URL is displayed in the YouTube application. In another example, the web-based application 140 may be accessed and/or opened using a software application such as Prism. Prism provides the ability for a website or web application that would otherwise be accessed and/or opened in a web browser to be opened as a standalone window similar to how a standard (or non-web-based) desktop application is opened. If a particular website or web application was configured to be accessed and/or opened as a standalone application (rather than through a web browser) in the first OS environment, such as be using Prism, then after receiving the intent, the standalone application 140 associated with the web session data is activated rather than the web browser.

Figure 2:
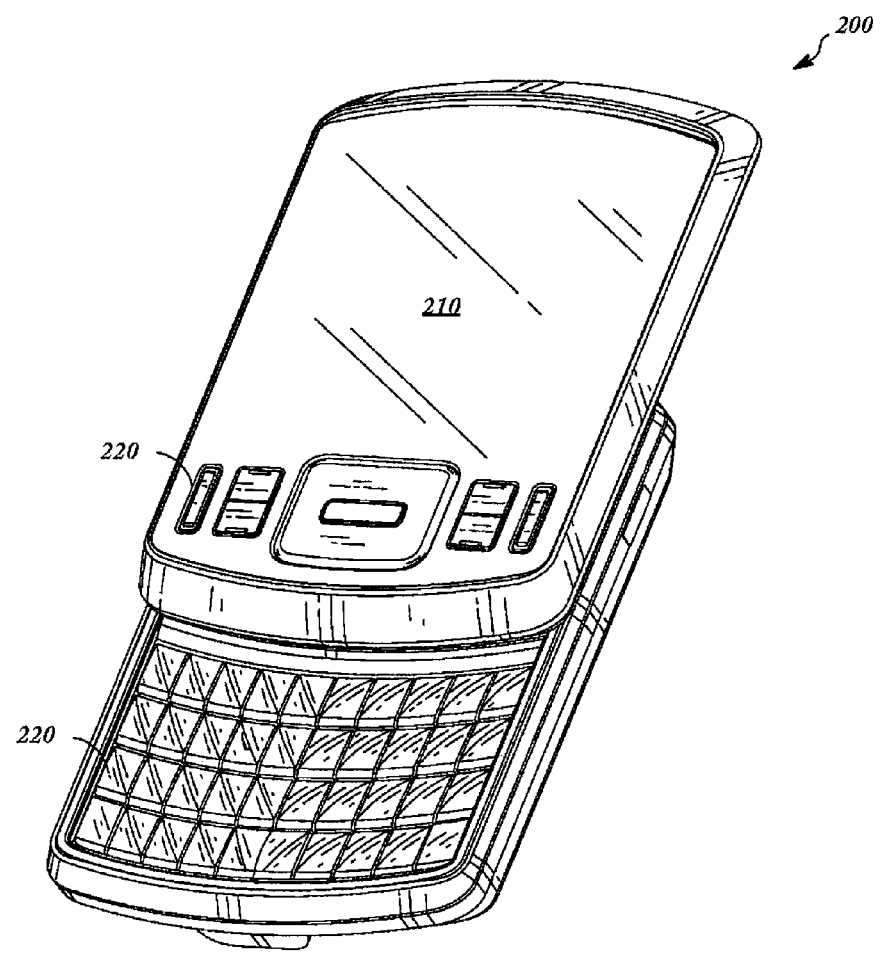
FIG. 2 illustrates an exemplary perspective view of a mobile device that may use the components of FIG. 1.
Figure 3:
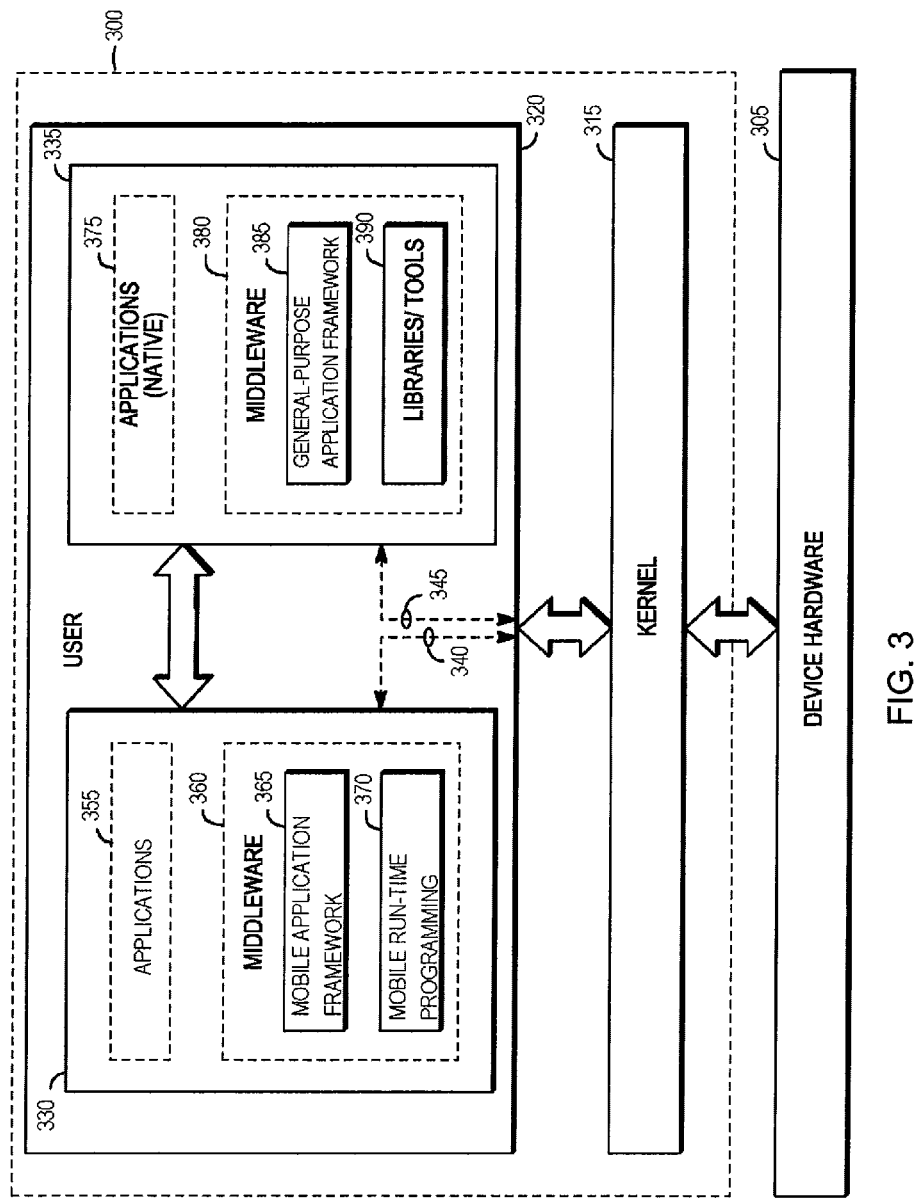
FIG. 3 is a block diagram representing in schematic form exemplary components of the mobile device of FIG. 2, including an exemplary operating system that has multiple environments.
Figure 4:
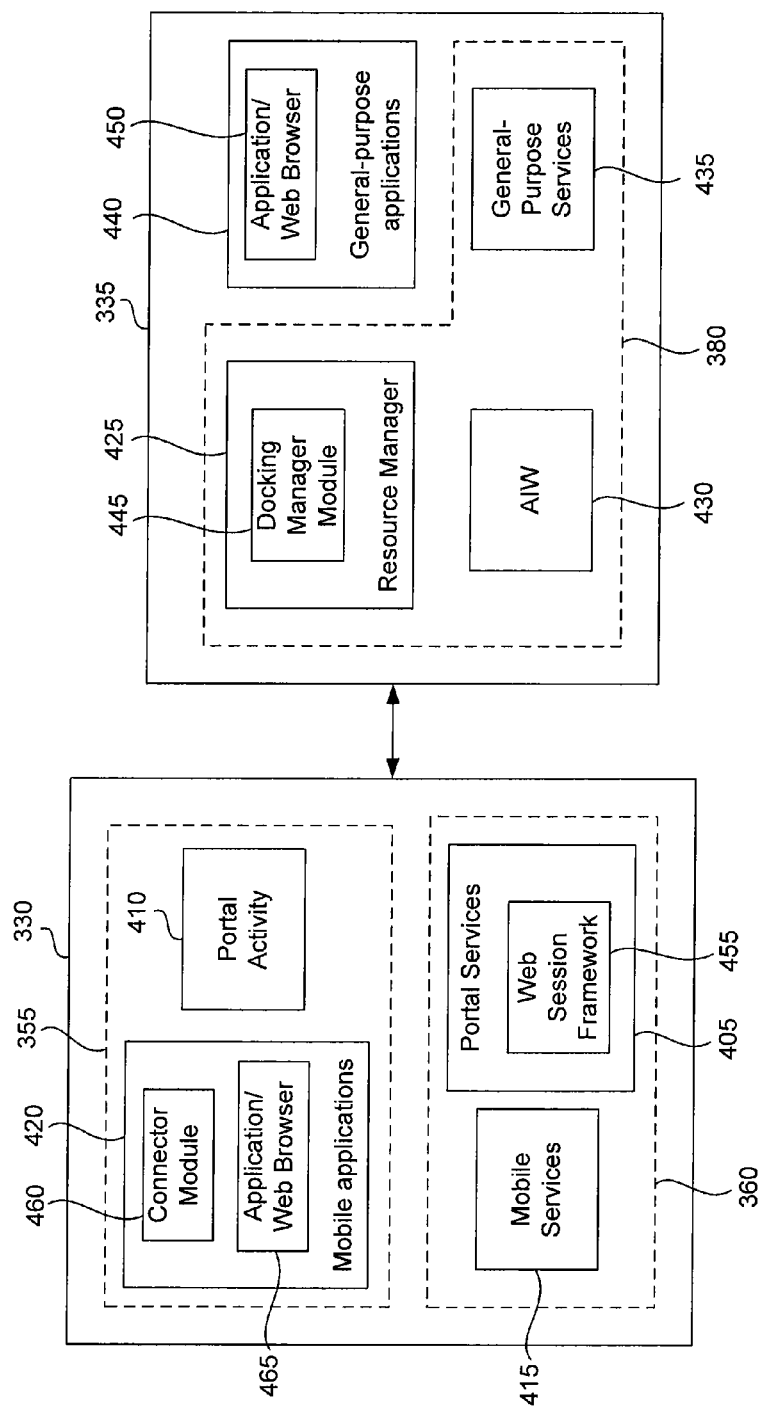
FIG. 4 is a block diagram representing in schematic form the exemplary operating system of FIG. 3 in further detail, and includes the components shown in FIG. 1.

The following FIGS. 2-4 show an example electronic device and exemplary components of the electronic device in which the components of the present disclosure may be used and/or implemented. Referring to FIG. 2, a mobile electronic device 200 is provided. The mobile device 200 includes a graphical user interface (GUI) 210 and a plurality of data input buttons 220. The mobile device 200 may be, but not limited to, a mobile personal computer (PC), a tablet PC, a netbook, a mobile telephone, a laptop computer, a handheld computer, or a smart phone. Other electronic devices may be used. A user may connect the device 200 to a variety of peripheral devices (not shown). The peripheral devices may be, but not limited to, a computer monitor, a laptop computer, a desktop computer, a tablet PC, or a screen projector.

FIG. 3 illustrates a block diagram showing in schematic form components of the mobile device 200 of FIG. 2. The mobile device 200 includes an operating system 300 in communication with device hardware 305. The operating system 300 may be a GNU/Linux distribution. Other operating systems may be used. As shown in FIG. 3, the operating system 300 includes a kernel 315 and a user component 320 that are in communication with each other. The user component 320 includes a first application-middleware environment 330 (hereinafter first OS environment) and a second application-middleware environment 335 (hereinafter second OS environment). As indicated by arrows 340 and 345, the first OS environment 330 and the second OS environment 335 are in communication with the kernel 315. In addition, the first OS environment 330 and the second OS environment 335 are in communication with each other.

The first OS environment 330 and the second OS environment 335 may operate and co-exist independently of one another. As an example, each of the OS environments 330, 335 may operate by itself without the presence of the other OS environment 330, 335. As another example, the OS environments 330, 335 may be different types (such as one OS environment 330, 335 being embedded, and the other OS environment 330, 335 not being embedded). As another example, the OS environments 330, 335 may perform different operations or functions while in communication with the kernel 315, the device hardware 305, and/or with a user of the device. Alternatively or in addition, the first OS environment 330 and the second OS environment 335 may be interdependent. For example, the first OS environment 330 and the second OS environment 335 may compete for resources of the kernel 315. Alternatively or in addition, the first OS environment 330 and the second OS environment 335 may operate in conjunction with one another.

In an exemplary embodiment, one of the OS environments 330, 335 is an OS environment intended for use in mobile devices (e.g., cell phones, smart phones, mobile personal computers, netbooks, lap tops, and handheld computers), and the other OS environment 330, 335 is a general-purpose OS environment that is not intended for use with mobile devices, and/or that is intended for use with stationary devices (e.g., a desktop computer). As non-limiting examples, the mobile OS environment 330 may be an Android, Window Mobile, Symbian, iOS, or RIM Blackberry mobile operating system environment. Other mobile OS environments may be used. As non-limiting examples, the general-purpose OS environment 335 may be a standard GNU/Linux, Windows, Unix, Mac OS X, or Google Chrome OS environment. The general-purpose OS environment 335 may also be a webtop environment. Other OS environments may be used. The mobile and general-purpose OS environments 330, 335 may be implemented with various types of kernels (e.g., Linux-based kernel, Windows-based kernel). Additionally, more than two OS environments of any of a variety of types may independently co-exist on the same kernel 315. For simplicity, as shown in FIG. 3, the first OS environment 330 is designated as the mobile environment and the second OS environment 335 is designated as the general-purpose environment. The OS environments 330, 335 may include several software components. As shown in FIG. 3, the mobile environment 330 includes applications 355 (e.g., user applications). The mobile environment 330 may also include middleware 360. The applications 355 may include stacks and other application software components, and also include computer instructions that are recognizable by the middleware 360 atop which the applications 355 are juxtaposed. The middleware 360 includes mobile application framework 365 and mobile run-time programming 370. The applications 355 may be managed by the application framework 365 and interpreted by the run-time programming 370.

The general-purpose environment 335 includes applications 375 (e.g., user applications) coupled to middleware 380. The middleware 380 may include both an application framework 385 and libraries/tools 390. The libraries/tools 390 may include a variety of components, including libraries such as Qt or GIMP Toolkit (GTK), which may be useful for display of information on a GUI. Other tools and/or libraries may be used. The applications 375 may be native applications in that the executable code of the applications 375 corresponds to the instruction set architecture of the kernel 315 and/or the device hardware 305. Like applications 355 in the mobile OS environment 330, the applications 375 in the general-purpose OS environment 335 may include stacks and other application software components, and may also include computer instructions that are recognizable by the middleware 380 atop which the applications 375 are juxtaposed.

The device hardware 305 may include a variety of hardware devices, such as a memory storage device (not shown) coupled to a processor (not shown), which stores computer executable instructions that are configured to perform various functions and operations. Additionally, the device hardware 305 may include a variety of other components/resources, such as cellular Bluetooth and/or WiFi transceivers or radios, keyboards, other input devices such as speakers and/or video screens, hardware, accelerators, IP sockets, etc. The kernel 315 allocates resources of the mobile device by connecting and managing interaction between the device hardware 305 and the middlewares 360, 380 of the OS environments 330, 335. The software components included in the middleswares 360, 380 (e.g., the application frameworks 365, 385, run-time programming 370, and/or libraries tools 390) may be referred to as the middleware because they are logically interposed between the kernel 315 and software applications 355, 375.

FIG. 4 illustrates the operating system 300 having the first OS environment 330 and the second OS environment 335 in further detail. FIG. 4 also illustrates the components of the first OS environment 330 and the second OS environment 335 that are used to create a web session and/or configure a web browser in one of the OS environments 330, 335 when the primary operating system environment of the operating system 300 transitions or changes from one of the OS environments 330, 335 to the other of the OS environments 330, 335. As shown in FIG. 4, the first OS environment 330 includes a portal service module 405, a portal activity module 410, a mobile services module 415, and a mobile applications module 420. The portal activity module 410 and the mobile applications module 420 may be considered among the applications 355 of the first OS environment 330 as shown in FIG. 3. Also, the portal services module 405 and the mobile services module 415 may be part of the middleware 360 of the first OS environment 330. Also, as shown in FIG. 4, the second OS environment 335 includes an arbiter or resource manager module 425, an Andoid in a window (AIW) module 430, a general-purpose services module 435, and a general-purpose OS applications module 440. The general-purpose OS applications module 440 may be part of the user applications 375 shown in FIG. 3. The resource manager 425, the AIW module 430, and the general-purpose services module may be part of the middleware 380 shown in FIG. 3. Alternatively, the AIW module 430 may be one of the user applications 375.

Modules 405, 410, 415, 425, 430, and 435 are configured to serve particular functions. The AIW module may be configured to display a first environment application window on the GUI 210 (shown in FIG. 2), while the second OS environment 335 is the primary OS environment. The portal service module 405 includes a set of instructions configured to allow service for the first OS environment 330 and directs all communication to the resource manager 425. While the mobile device 200 is operating, the portal service module 405 is preferably running at all times. Additionally, the portal service module 405 is connected to activity associated with the portal activity module 410. The portal activity module 410 may be a second OS environment 335 application located on the first environment 330 stack. As an example, if the second OS environment is an Ubuntu environment, the portal activity module 410 may represent a Ubuntu application, and when the portal activity module 410 has focus (i.e., when the portal activity module is on top of other applications 355 displayed in the GUI 220), Ubuntu is in view through the GUI 220.

As shown in FIG. 4, the resource manager module 425 in the second OS environment 335 and the portal services module 405 in the first OS environment communicate directly with each other. The resource manager module 425 and the portal services module 405 may communicate directly with each other to avoid conflicts in operation of middleware 260 and middleware 280. The resource manager module 425 may be a set of instructions configured to manage the resources shared by the first OS environment 330 and the second OS environment 335. The shared resources include display devices, input devices, power management services, and system state information. Further, the resource manager 425 may be configured to control the accessing of the device hardware 305 by the OS environments 330, 335. Additionally, the resource manager 425 may identify and control which user interface associated with the environments 330, 335 is displayed through the GUI 220. The portal service module 405 may be the source of all communications from the first environment 330 to the resource manager 425. Additionally, the portal service module 405 may be a sink for all callbacks from the resource manager 425 to the first OS environment 330.

In addition, FIG. 4 shows the components of the present disclosure used to create a web session and/or update a web browser configuration in one of the environments 330, 335 based on web session data and/or web browser configuration data from the other OS environment 330, 335. As shown in FIG. 4, a docking manager module mobile 445 is located in the resource manager module 425. An application/web browser 450 is located in the general-purpose OS applications module 440. A framework 455 for transferring intents containing web session data and or web browser or configuration data between the mobile OS environment 330 and the general-purpose OS environment 335 is located in the portal services module 405. A connector module 460 and a web application/web browser 465 are located in the mobile OS applications module 420.

As described above with reference to FIG. 1, when the primary OS environment of the operating system 300 transitions from the second OS environment 335 to the first OS environment 330, the docking manager module 445 located in the resource manager module 425 may receive a state change signal. In response to receiving the state change signal, the docking manager module 445 may query the web browser 450 located in the general-purpose OS applications module 440 for web session data and/or web browser configuration data. After the docking manager 445 receives the web session data and/or the web browser configuration, the docking manager 445 may generate one or more intents containing the web session data and/or the web browser configuration data. The intent may also include actions to perform on the data. The docking manager module 445 may transfer the intent to the mobile OS environment 330 using the framework 455 located in the portal services module 405. The connector module 460 located in the mobile OS environment applications module may receive the intent. The connector module 460 may be configured to parse and/or store the data in the intent in a storage location (e.g., in a storage location in device hardware 305). The connector module 460 may create a web session and/or configure the web browser 465 based on the received web session data and/or the web browser configuration data. In one example, after receiving the intent, the connector module 460 may display the web session data and/or the web configuration data in a user interface for a user selection. After the web session data is selected, the connector module 460 may generate an intent based on the user selection, which is used to activate the web browser 465 (or other web application associated with the web session data), and the web browser 465 opens the one or more websites, webpages, web applications, and/or other web data associated with the web session data that was selected. Alternatively or in addition, after the web browser configuration data is selected, the configuration of the web browser 465 may be updated based on the user selection.

Similarly, as described above with reference to FIG. 1, when the primary OS environment of the operating system 300 transitions from the first OS environment 330 to the second OS environment 335, the connector module 460 may receive a state change signal. In response to receiving the state change signal, the connector module 460 located in the mobile OS applications module 420 may query the web browser 465 for web session data and/or web browser configuration data. After the connector module 460 receives the web session data and/or the web browser configuration, the connector module 460 may generate one or more intents containing the web session data and/or the web browser configuration data. The intent may also include actions to perform on the data. The connector module 460 may transfer the intent to the general-purpose OS environment 335 using the framework 455 located in the portal services module 405. The docking manager module 445 located in the resource manager module 425 may receive the intent. The docking manager module 445 may be configured to parse and/or store the intent in a storage location (e.g., in a storage location in device hardware 305). The docking manager 445 may create a web session and/or configure the web browser 450 based on the received web session data and/or the web browser configuration data. In one example, after receiving the intent, the docking manager module 445 may display the web session data and/or the web configuration data in a user interface for a user selection. After one or more web session data is selected, the docking manager module 445 may generate an intent based on the user selection, which activates the web browser 450 (or other web application associated with the web session data), and the web browser 450 opens the one or more websites, webpages, web applications, and/or other web data associated with the web session data. Alternatively or in addition, after the web browser configuration data is selected, the configuration of the web browser 450 may be updated based on the user selection.

As explained above, when the primary OS environment transitions from one of the OS environments 330, 335, the docking manager module 445 or the connector module 460 may receive a mode state change signal. The mode state change signal may be generated when the docking state of the electronic device 200 transitions from a docked state to a mobile state, or from a mobile state to a docked state. In one example, a cable signal is received by the resource manager module 425 that indicates that a cable (such as an HDMI or a USB cable) was connected to the electronic device 200, which connects the electronic device 200 to a peripheral device. Alternatively a cable signal is received by the resource manager module 425 that indicates that a cable (such as an HDMI or a USB cable) was disconnected from the electronic device 200, which disconnects the electronic device 200 from the peripheral device. Alternatively, the cable signal may be received by the resource manager module 425 when a wireless communication between the electronic device 200 and the peripheral device is either enabled or disabled. After the cable signal is received by the resource manager module 425, a signal is sent from the resource manager module 425 to the portal activity module 410 indicating a mode status transition. In response to receiving the signal, the portal activity module 410 sends a signal to the resource manager module 425 indicating that one of the OS environments 330, 335 is the primary OS environment. For example, if the cable was disconnected from the electronic device 200 (or the wireless connection between the electronic device 200 and a peripheral device was disabled), then the signal sent from the portal activity module 410 indicates that the mobile OS environment is the primary OS environment. On the other hand, if the cable was connected to the electronic device 200 (or the wireless connection between the electronic device 200 and the peripheral device was enabled), then the signal sent from the portal activity module 410 indicates that the general-purpose OS environment is the primary OS environment. Further, a signal is sent from the resource manager 425 to the portal activity module 405 indicating that the OS environment 330, 335 that has become the primary OS environment has taken ownership of a framebuffer. Additionally, a mode state change signal (also referred to as a mode state change confirmation signal) is sent from the portal activity module 410 to the resource module 425 identifying that the electronic device 200 is in the mobile mode or the docked mode. The mode state change signal indicates that the electronic device 200 is in the mobile mode if the cable was disconnected or the wireless connection is disabled. The mode state change signal indicates that the electronic device 200 is in the docked mode if the cable was connected or the wireless connection is enabled. The docking manager 445 and/or the connector module 460 receive the mode state change signal. The docking manager 445 and/or the connector module 460 query the respective web browser 450, 460 in response to receiving the mode state change signal.

Figure 5:
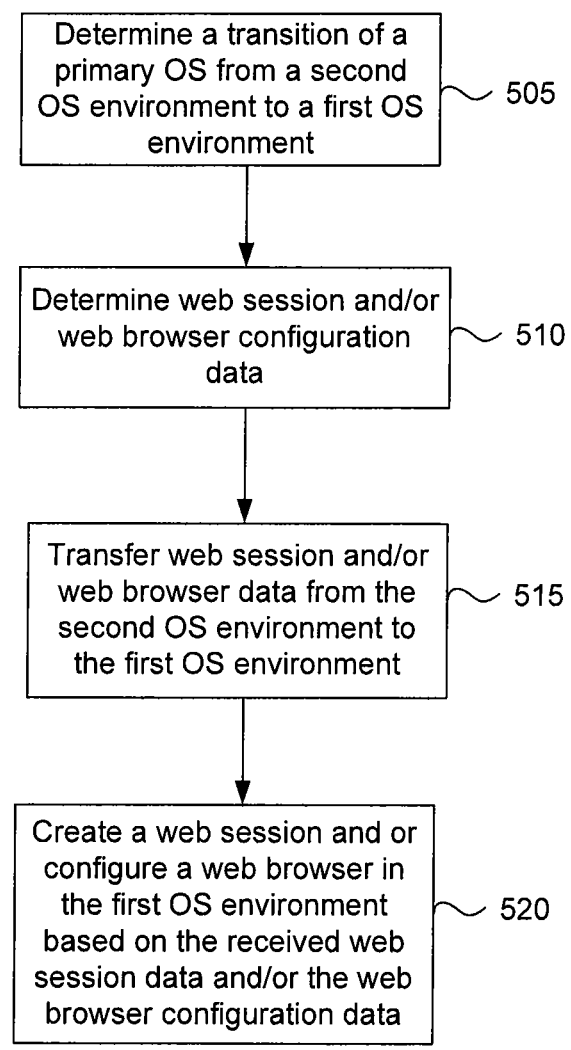
FIG. 5 illustrates an example method for creating a web session and/or updating a configuration of a web browser in a first operating system environment based on a web session and/or a web browser configuration in a second operating system environment when the primary operating system transitions from the second operating system environment to the first operating system environment.

FIG. 5 illustrates an exemplary method for creating a web session and/or updating a web browser configuration in a first OS environment based on a web session and/or web browser configuration in a second OS environment when the primary OS environment transitions from the second OS environment to the first OS environment. At step 505, a first module located in the second OS environment determines a transition of the primary OS environment from the second OS environment to the first OS environment. The first module may be the docking manager module or the connector module as described above. The first module may determine the transition based on receiving a mode state change signal. At step 510, after determining the transition in the primary OS environment, the first module may determine web session data and/or web browser data. The first module may determine the data by querying a web browser in the second OS environment for web session data and/or web browser configuration data. At step 515, the first module sends or transfers the web session data and/or the web browser configuration data to the first OS environment. At step 515, the web session data and/or the web browser configuration data is transferred from the second OS environment to the first OS environment. The first module may send the data using an intent. After receiving the data from the web browser, the user creates an intent that includes the data. The intent may also include one or more actions to be performed on the data. A second module located in the first OS environment receives the intent. After receiving the intent, the second module may parse and/or store the data after receiving the intent. At step 520, a web session is created and/or a web browser is configured in the first OS environment. In one example, creating the web session and/or configuring a web browser in the first OS environment includes displaying the web session data and/or the web browser configuration data in a user interface. After a user inputs a user selection using the user interface, the second module receives the user selection of the web session data and/or the web browser data. The second module may generate an intent that creates a web session and/or configures a web browser in the first OS environment. If a user selects some or all of the web session data, then the second module may generate and dispatch an intent to a framework of the first OS environment that launches a web browser or other application in the first OS environment and accesses and/or opens a website, webpage, web application, or other web data associated with the selected web session data. Alternatively or in addition, if the user selects some or all of the web browser configuration data, then the second module may generate an intent that updates a configuration of the web browser in the first OS environment based on the user selection.

As described above, the electronic device 200 may transition between mode states and/or environments in response to an unsolicited event such as the docking or undocking of the electronic device 200. Alternatively or in addition, the electronic device 200 may transition between mode states and/or environments based upon events other than docking or undocking the mobile device 200, and/or based upon events other than unsolicited events. For example, if the electronic device 200 is stationary for a preset period of time, the electronic device 200 may be configured to operate in the most energy efficient mode state, regardless of the device status otherwise. As another example, a user can transition from the mode state from docked to mobile even if the device has a connection with a peripheral device. Additionally, the type of peripheral device connected to the mobile device 200 can dictate whether an automatic mode state change sequence is initiated or a user has provided a mode state change request. In one example, a user may be able to select the mode state in which to operate the mobile device.

Further, the electronic device 200 may switch from one OS environment to another OS environment as the primary environment when a user activates an application associated with the other environment. The electronic device 200 may be configured so that any event or events can trigger a change in a mode state. As an example, if the electronic device 200 is in communication with a web server or intermediate server, a push from the web server or intermediate server (e.g., a forced sending of information from the server to the electronic device 200), can automatically trigger a switching from one OS environment to another OS environment suitable for receiving the pushed information. Any of the above described events that transition the primary OS environment of the electronic device 200 from one OS environment to another OS environment may trigger web session data and/or web browser configuration data to be transferred from one OS environment to another OS environment.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A method for creating a first web session in a first operating system (OS) environment of an operating system in an electronic device based on a second web session in a second OS environment of the operating system in the electronic device, the method comprising:
   determining a transition of a primary OS environment of the operating system in the electronic device from the second OS environment of the operating system in the electronic device to the first OS environment of the operating system in the electronic device;
   determining web session data associated with the second web session in response to determining the transition of the primary OS environment of the operating system in the electronic device from the second OS environment of the operating system in the electronic device to the first OS environment of the operating system in the electronic device; and
   creating the first web session in the first OS environment of the operating system in the electronic device based on the web session data associated with the second web session, wherein the web session data is transferred from the second OS environment using an intent, and wherein the intent includes one of a data structure including the description of an action to be performed on data, a data on which action is to be performed, or an action on data.

2. The method of claim 1, wherein determining the transition of the primary OS environment of the operating system in the electronic device from the second OS environment of the operating system in the electronic device to the first OS environment of the operating system in the electronic device comprises determining a transition in a docking state.

3. The method of claim 2, wherein determining a transition in a docking state comprises determining a transition from a docked state to an undocked state.

4. The method of claim 2, wherein determining a transition in a docking state comprises determining a transition from an undocked state to a docked state.

5. The method of claim 1, wherein determining the web session data associated with the second web session comprises querying a web browser in the second OS environment of the operating system in the electronic device for the web session data.

6. The method of claim 1, wherein creating the first web session in the first OS environment of the operating system in the electronic device comprises:
   storing the web session data; and
   activating an application in the first OS environment of the operating system in the electronic device associated with the stored web session data.

7. The method of claim 6, wherein activating an application in the first OS environment of the operating system in the electronic device comprises:
   activating a web browser in the first OS environment of the operating system in the electronic device; and
   opening a website associated with the web session data in the web browser.

8. The method of claim 6, further comprising:
   displaying the web session data for a user selection of the web session data,
   wherein the application is activated in the first OS environment of the operating system in the electronic device based on the user selection.

9. An electronic device comprising:
   a processor coupled to a memory having executable instructions configured to initiate an operating system in the electronic device; and
   the operating system in the electronic device configured to run a first operating system (OS) environment and a second OS environment on a single kernel of the electronic device,
   wherein the second OS environment of the operating system in the electronic device comprises:
      a first module configured to:
         determine a transition of a primary OS environment of the operating system in the electronic device from the second OS environment of the operating system in the electronic device to the first OS environment of the operating system in the electronic device; and
         determine web session data associated with a web session in the second OS environment of the operating system in the electronic device; and
   wherein the first OS environment of the operating system in the electronic device comprises:
      a second module configured to:
         receive the web session data from the first OS environment of the operating system in the electronic device, wherein the web session data is transferred from the second OS environment using an intent, and wherein the intent includes one of a data structure that contains the description of an action to be performed on data, a data on which action is to be performed, or an action on data; and activate an application in the first OS environment of the operating system in the electronic device associated with the web session data.

10. The electronic device of claim 9, wherein the first module is further configured to receive a mode state change signal.

11. The electronic device of claim 10, wherein the first module is further configured to query a web browser in the second OS environment of the operating system in the electronic device for the web session data in response to receiving the mode state change signal.

12. The electronic device of claim 10, wherein the mode state change signal indicates a change from a docked state to an undocked state.

13. The electronic device of claim 10, wherein the mode state change signal indicates a change from an undocked state to a docked state.

14. The electronic device of claim 11, wherein the first module is further configured to send the web session data to the first OS environment of the operating system in the electronic device.

15. The electronic device of claim 14, wherein the second OS environment of the operating system in the electronic device further comprises a web session framework for sending web session data from the second OS environment of the operating system in the electronic device to the first OS environment of the operating system in the electronic device, wherein the first module uses the web session framework to send the web session data to the first OS environment of the operating system in the electronic device.

16. The electronic device of claim 9, wherein the second module is further configured to:

parse the web session data based on URL information; and
store the parsed web session data in a database.

17. The electronic device of claim 9, wherein the second module is further configured to:

activate a web browser in the first OS environment of the operating system in the electronic device; and
open a website associated with the web session data in the web browser in the first OS environment of the operating system in the electronic device.

18. The electronic device of claim 9, wherein the second module comprises a user interface, the second module being configured to display the web session data in the user interface for a user selection; and wherein the second module is configured to activate the application associated with the web session data based on the user selection.

19. The electronic device of claim 18, wherein the second module is configured to open a website associated with the web session data in a web browser in the first OS environment of the operating system in the electronic device based on the user selection.

20. The electronic device of claim 9, wherein the first OS environment of the operating system in the electronic device comprises an embedded operating system configured for mobile computing, and wherein the second OS environment of the operating system in the electronic device comprises a general-purpose operating system environment.

21. The electronic device of claim 20, wherein the general-purpose operating system environment comprises a webtop environment.

22. A method for updating a configuration of a web browser in a first operating system (OS) environment of an operating system in an electronic device comprising:

determining a transition of a primary OS environment of the operating system in the electronic device from a second OS environment of the operating system in the electronic device to the first OS environment of the operating system in the electronic device;

determining a configuration of a web browser in the second OS environment of the operating system in the electronic device based on determining the transition of the primary OS environment of the operating system in the electronic device from the second OS environment of the operating system in the electronic device to the first OS environment of the operating system in the electronic device;

updating the configuration of the web browser in the first OS environment of the operating system in the electronic device based on the configuration of the web browser in the second OS environment of the operating system in the electronic device, wherein the configuration of the web browser is transferred from the second OS environment using an intent, and wherein the intent includes one of a data structure that contains the description of an action to be performed on data, a data on which action is to be performed, or an action on data.

23. The method of claim 22, wherein determining the transition of the primary OS environment of the operating system in the electronic device from the second OS environment of the operating system in the electronic device to the first OS environment of the operating system in the electronic device comprises determining a transition in a docking state.

24. The method of claim 23, wherein updating the configuration of the web browser in the first OS environment of the operating system in the electronic device comprises updating at least one of the following of the web browser in the first OS environment of the operating system in the electronic device:

browsing history;
download history;
search history;
form field entry history;
cookies;
login and password data;
home page information;
bookmark information; and
webpage display information.

25. The method of claim 22, wherein web browser configuration data of the web browser in the second OS environment of the operating system in the electronic device is transferred from the second OS environment of the operating system in the electronic device to the first OS environment of the operating system in the electronic device over a secured channel.

* * * * *